United States Patent
Doi (10) Patent No.: US 7,519,241 B2
(45) Date of Patent: Apr. 14, 2009

(54) OPTICAL DEVICE

(75) Inventor: Masaharu Doi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/856,480

(22) Filed: Sep. 17, 2007

(65) Prior Publication Data
US 2008/0008412 A1    Jan. 10, 2008

Related U.S. Application Data

(63) Continuation of application No. PCT/JP2005/004954, filed on Mar. 18, 2005.

(51) Int. Cl.
   *G02F 1/035* (2006.01)
   *G02F 1/295* (2006.01)
(52) U.S. Cl. .................... 385/3; 385/8; 385/40
(58) Field of Classification Search ............. 385/2, 385/3, 8, 9, 40
   See application file for complete search history.

(56) References Cited

U.S. PATENT DOCUMENTS

| | | | | |
|---|---|---|---|---|
| 5,044,715 | A | * | 9/1991 | Kawachi et al. ............. 385/42 |
| 5,524,076 | A | | 6/1996 | Rolland et al. |
| 5,835,212 | A | * | 11/1998 | Kissa et al. ................ 356/477 |
| 6,091,864 | A | | 7/2000 | Hofmeister |
| 6,204,951 | B1 | * | 3/2001 | Coward et al. ............ 359/245 |
| 6,763,197 | B1 | | 7/2004 | Hirano et al. |
| 7,286,731 | B2 | * | 10/2007 | Yang ......................... 385/27 |

| | | |
|---|---|---|
| 2003/0219188 A1 | 11/2003 | Doi et al. |
| 2004/0114208 A1 | 6/2004 | Balsamo et al. |
| 2007/0086691 A1 * | 4/2007 | Toyoda et al. .............. 385/8 |

FOREIGN PATENT DOCUMENTS

| | | |
|---|---|---|
| JP | 58-202406 | 11/1983 |
| JP | 2001-339346 | 12/2001 |
| JP | 2003-329986 | 11/2003 |

OTHER PUBLICATIONS

John C. Cartledge, "Performance of 10 Gb/s Lightware Systems Based on Lithium Niobate Mach-Zehnder Modulators with Asymmetric Y-Branch Waveguides", *IEEE Photonics Technology Letters*, vol. 7, No. 9, Sep. 1995, pp. 1090-1092.
G. Ghislotti et al., "Single-Drive LiNbO₃ Mach-Zehnder Modulator With Widely DC Tunable Chirp", *IEEE Photonics Technology Letters*, vol. 15, No. 11, Nov. 2003, pp. 1534-1536.

* cited by examiner

*Primary Examiner*—Sung H Pak
*Assistant Examiner*—Daniel Petkovsek
(74) *Attorney, Agent, or Firm*—Staas & Halsey LLP (57) ABSTRACT

The present invention relates to an optical device including a branching unit for making branches of incident light in a first branch ratio, a phase adjusting unit for adjusting the relationship in phase among branched lights obtained by the branching unit and a combining/branching unit for combining the lights after the phase adjustment by the phase adjusting unit and for then making branches of the combined light in a second branch ratio, at least one of the first branch ratio and the second branch ratio being previously set at a branch ratio other than 1:1. This can realize an optical device capable of properly selecting output light with a different wavelength chirp quantity.

11 Claims, 12 Drawing Sheets

FIG. 11A
Z-cut MODULATOR ($\alpha = -0.7$)

FIG. 11B

FIG. 12A
X-cut MODULATOR ($\alpha = 0$)

OPTICAL DEVICE

This application is a continuation application, filed under 35 USC 111(a), of International Application PCT/JP2005/004954, filed Mar. 18, 2005, which is herein incorporated by reference in its entirety.

TECHNICAL FIELD

The present invention relates to an optical device, and more particularly to an optical device capable of selecting a different wavelength chirp quantity.

BACKGROUND ART

So far, as Mach-Zehnder optical modulators having a waveguide structure, there have been known a type using a Z-cut substrate obtained by cutting a crystal with an electro-optical effect, such as $LiNbO_3$ [lithium niobate (LN)] crystal or $LiTaO_2$ [lithium tantalate (LT)] crystal, in a Z-axis direction of the crystal orientation and a type using an X-cut substrate obtained by cutting it in an X-axis direction of the crystal orientation.

Figure 11A:
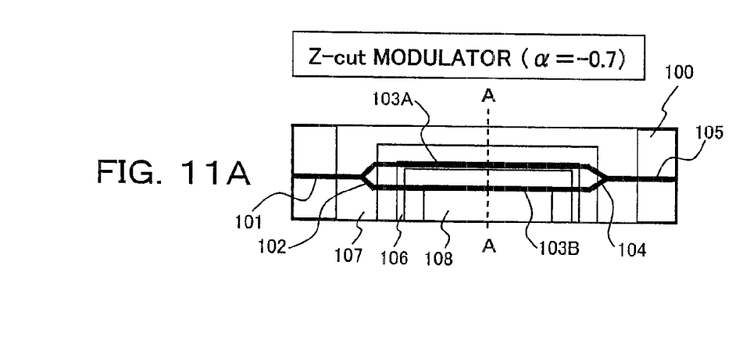
[FIG. 11A] is a plan view illustratively showing a configuration of an optical modulator (Z-cut modulator).
Figure 11B:
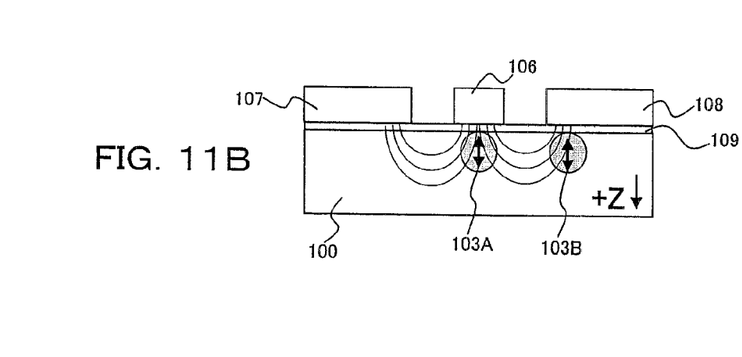
[FIG. 11B] is a cross-sectional view taken along A-A in FIG. 11A.
Figure 12A:
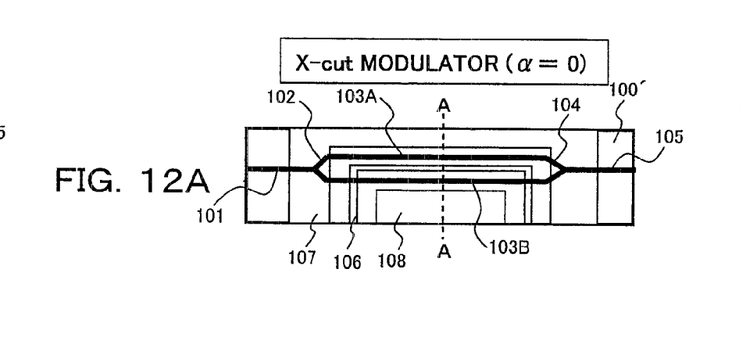
[FIG. 12A] is a plan view illustratively showing a configuration of an optical modulator (X-cut modulator).
Figure 12B:
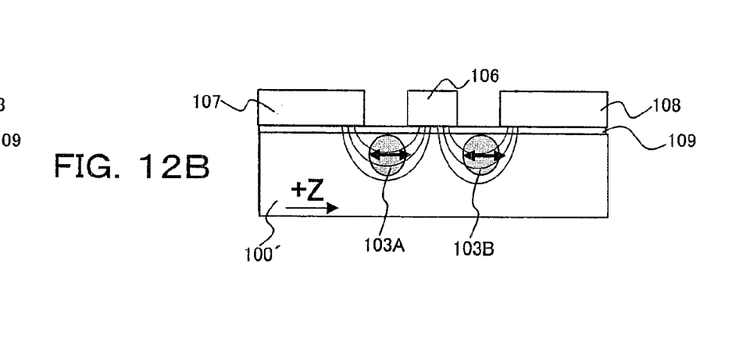
[FIG. 12B] is a cross-sectional view taken along A-A in FIG. 12A.

FIG. 11A is a plan view illustratively showing a structure of an optical modulator (Z-cut modulator) using a Z-cut substrate, FIG. 11B is a cross-sectional view taken along A-A in FIG. 11A, FIG. 12A is a plan view illustratively showing a structure of another optical modulator (X-cut modulator) using an X-cut substrate and FIG. 12B is a cross-sectional view taken along A-A in FIG. 12A.

First of all, as shown in FIG. 11A, on a Z-cut substrate 100, the Z-cut modulator has, for example, an incidence waveguide 101, a incidence side Y-branch wave guide 102, parallel waveguides 103A and 103B, an outgoing side Y-branch waveguide 104 and an outgoing waveguide 105, with a signal electrode 106 and earth electrodes 107, 108 being patterned thereon.

For the formation of such a Z-cut modulator, waveguides 101, 102, 103A, 103B, 104 and 105 are produced by forming a metallic film on a portion of a crystal substrate and making thermal diffusion thereon or by patterning a metallic film and then making proton exchange or the like in benzoic acid, thereafter placing electrodes in the vicinity of the parallel waveguides 103A and 103B.

However, since the Z-cut modulator utilizes a variation of refractive index stemming from an electric field in the Z direction, as shown in FIG. 11B, portions of the electrodes 106 and 108 are located right above the parallel waveguides 103A and 103B, respectively.

On the other hand, as shown in FIG. 12A, on an X-cut substrate 100', the X-cut modulator has, for example, an incidence waveguide 101, an incidence side Y-branch waveguide (branching unit) 102, parallel waveguides 103A and 103B, an outgoing side Y-branch waveguide (combining unit) 104 and an outgoing waveguide 105, with a signal electrode 106 and earth electrodes 107, 108 being patterned thereon. Because of the utilization of a variation of refractive index stemming from an electric field in the Z direction, as shown in FIG. 12B, the parallel waveguides 103A and 103B are positioned between the signal electrode 106 and the earth electrode 107 and between the signal electrode 106 and the earth electrode 108, respectively.

For preventing light propagating in waveguides from being absorbed by the earth electrodes 107 and 108, as shown in FIGS. 11B and 12B, a dielectric layer (buffer layer) 109 is usually placed between the substrate 100 (100') and the signal electrode 106, the earth electrodes 107, 108. As the buffer layer 109, for example, there is used $SiO_2$ having a thickness of 0.2 to 1.0 μm.

In each of the Z-cut modulator and the X-cut modulator, configured as mentioned above, when light is incident on the incidence waveguide 101, this incident light is led from the incidence waveguide 101 to the incidence side Y-branch waveguide 102 where it is divided into two in the same power ratio so as to propagate in the parallel waveguides 103A and 103B.

At this time, in a case in which a microwave electric signal [drive voltage; half-wavelength voltage Vπ] is applied to the signal electrode 106, as shown in FIG. 11B or 12B, the refractive indexes of the two parallel waveguides 103A and 103B respectively vary as +Δna and −Δnb due to the electric field stemming from this microwave electric signal and the phase difference between the parallel waveguides 103A and 103B, so the light combined in the outgoing side Y-branch waveguide 104 becomes intensity modulated light and is outputted from the outgoing waveguide 105.

In this case, it is known that, in the Z-cut modulator, modulated light with a wavelength chirp (quantity) α=−0.7 is obtained because of Δna:Δnb to 5:1 while, in the X-cut modulator, modulated light with a wavelength chirp α=0 is obtained because of Δna:Δnb to 1:1. Accordingly, in many cases, the Z-cut modulator is used for the long-distance optical transmission while the X-cut modulator is for use in the relatively-short-distance optical transmission.

As a conventional technique on an optical modulator, there exists a technique proposed in the following Patent Document 1, and as a conventional technique using an optical modulator, there exists a technique proposed in the following Patent Document 2.

The technique in the Patent Document 1 is for the purpose of, in an optical modulator suitable for use in an optical communication system, suppressing the generation of radiation mode light to improve the performance as a device. Thus, in the optical modulator disclosed in the Patent Document 1, a combination waveguide (3 dB) coupler includes two input waveguides for receiving propagation lights from two linear waveguides, a waveguide coupling unit and two output waveguides, and the input side width of the waveguide coupling unit is set to be larger than the total width of the two input waveguides and the output side width of the waveguide coupling unit is set to be larger than the total width of the two output waveguides. This can suppress the generation of the incidence side and outgoing side radiation mode lights with respect to the waveguide coupling unit, thereby enhancing the performance as a device.

The technique in the Patent Document 2 is for the purpose of providing an optical transmitter having a high proof strength with respect to the group velocity dispersion of an optical fiber, having a low reception sensitivity degradation and less susceptible to the influence of the group velocity dispersion at the enlargement of the network scale. Thus, an optical transmitter is composed of a light source section capable of generating an optical clock pulse synchronized with a signal bit rate in a given duty ratio and variably setting the duty ratio of the optical clock pulse and an encoding section for setting the relative optical phase difference between the optical clock pulses of the adjacent time slots at odd number times of π and encoding an optical clock pulse through the use of an electric signal synchronized with the optical clock pulse. Therefore, since the duty ratio of the optical clock pulse is variable, a high dispersion proof strength and a small reception sensitivity degradation are compatible by setting the duty ratio at an appropriate value.

Moreover, since the relative optical phase difference between the optical clock pulses of time slots adjacent to each other is set at the odd number times of π or a value approximate thereto, a high dispersion proof strength is stably maintainable. That is, the configuration of a stable optical transmitter becomes feasible, which enables a suitable construction of a network with a larger scale.

However, in the case of the above-mentioned conventional techniques, there is a need to prepare a dedicated optical modulator (Z-cut modulator or X-cut modulator) having a different wavelength chirp α according to a needed optical transmission distance at the construction of an optical transmission system. In addition, when the optical transmission distance is changed after the system construction, for example, there is a need to replace the optical modulator with one having a desired wavelength chirp α, which leads to low flexibility.

Figure 13:
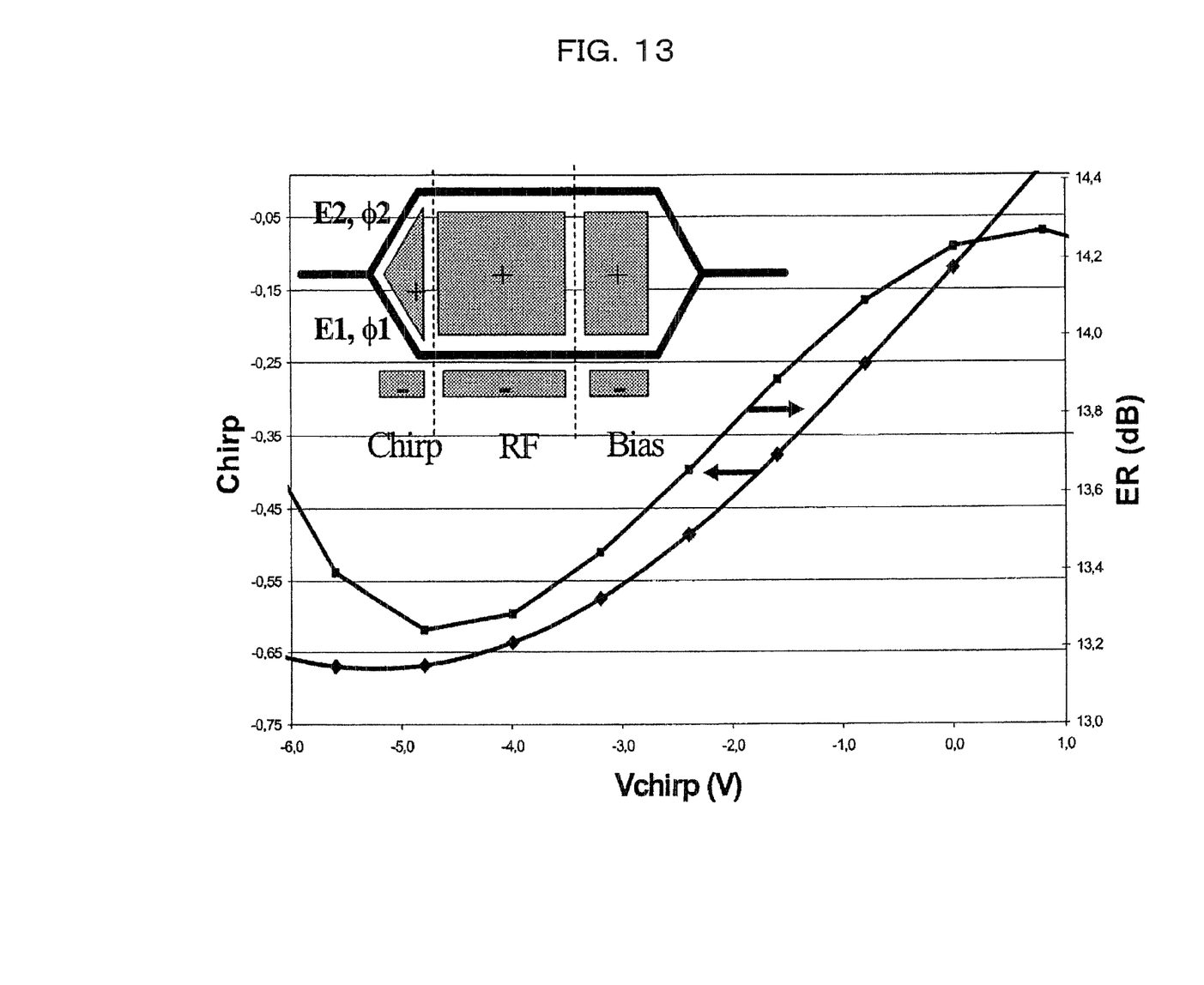
[FIG. 13] is an illustration for explaining a conventional wavelength chirp quantity variable technique.

For this reason, so far, for example, as disclosed in the following Non-Patent Document 1, in a 1-input 1-output type optical modulator having a basic structure similar to the optical modulators mentioned above with reference to FIGS. 11A and 12A, there is proposed a technique of applying a direct-current (DC) voltage to an incidence side Y-branch waveguide (branching unit) so that the branch ratio of the incident light in the incidence side Y-branch waveguide becomes variable to make the wavelength chirp quantity variable (see FIG. 13).

However, this technique cannot simply provide output light with a different wavelength chirp quantity.

The present invention has been developed in consideration of these problems, and it is an object of the invention to simply provide output light with a different wavelength chirp quantity. Patent Document 1: Japanese Patent Laid-Open No. 2003-329986 Patent Document 2: Japanese Patent Laid-Open No. 2001-339346 Non-Patent Document 1: AVANEX corporation, "Single-Drive LiNbO3 Mach-Zehnder Modulator With Widely DC Tunable Chirp", IEEE Photon. Technol. Lett., Vol. 15, pp. 1534-1536 (2003).

DISCLOSURE OF THE INVENTION

For achieving the above-mentioned purpose, an optical device according to the present invention is characterized by comprising:

(1) a branching unit which branches incident light in a first branch ratio, a phase adjusting unit for adjusting the relationship in phase among branched lights obtained by the branching unit and a combining/branching unit which combines the lights after the phase adjustment by the phase adjusting unit and which branches the combined light in a second branch ratio, wherein at least one of the first branch ratio and the second branch ratio is previously set at a branch ratio other than 1:1.

(2) In this case, when the aforesaid first branch ratio is p:1−p (p designates a real number satisfying 0<p<1), the aforesaid second branch ratio is q:1−q (q designates a real number satisfying 0<q<1) and an optical modulation efficiency stemming from the adjustment of the phase relationship in the aforesaid phase adjusting unit is a:b (where a and b represent real numbers satisfying a+b=1), one output light from the combining/branching unit, inputted from one inputting port of the branching unit, has a wavelength chirp quantity $\alpha_{1-3}$ expressed by the following equation (1) and the other output light has a wavelength chirp quantity $\alpha_{1-4}$ expressed by the following equation (2), while one output light from the combining/branching unit, inputted from the other inputting port of the branching unit, has a wavelength chirp quantity $\alpha_{2-3}$ expressed by the following equation (3) and the other output light has a wavelength chirp quantity $\alpha_{2-4}$ expressed by the following equation (4).

$$\alpha_{1-3} = \frac{apq - b(1-p)(1-q)}{\sqrt{pq(1-p)(1-q)}} \quad (1)$$

$$\alpha_{1-4} = \frac{ap(1-q) - bq(1-p)}{\sqrt{pq(1-p)(1-q)}} \quad (2)$$

$$\alpha_{2-3} = \frac{a(1-p)q - bp(1-q)}{\sqrt{pq(1-p)(1-q)}} \quad (3)$$

$$\alpha_{2-4} = \frac{a(1-p)(1-q) - bpq}{\sqrt{pq(1-p)(1-q)}} \quad (4)$$

(3) In addition, it is also appropriate that the optical device according to the present invention further comprises an output light selecting unit which selects output light of the aforesaid combining/branching unit when the second branch ratio is set at a branch ratio other than 1:1.

(4) Still additionally, it is also appropriate that the optical device according to the present invention further comprises an input light selecting unit which selects input light of the aforesaid branching unit when the first branch ratio is set at a branch ratio other than 1:1.

(5) Yet additionally, it is also appropriate that the aforesaid first branch ratio is set at 1:1 while the second branch ratio is set at 2:1.

(6) Moreover, it is also appropriate that the aforesaid first branch ratio is set at 1:1 while the second branch ratio is set at 2:1, and the aforesaid modulation efficiency is set at 2:1.

(7) Still moreover, it is also appropriate that the aforesaid first branch ratio is set at 2:1 while the second branch ratio is set at 1:1.

(8) Yet moreover, it is also appropriate that the aforesaid first branch ratio is set at 2:1 while the second branch ratio is set at 1:1, and the aforesaid modulation efficiency is set at 2:1.

(9) Furthermore, it is also appropriate that the optical device according to the present invention further comprises a branch ratio adjusting unit which fine-adjusts the branch ratio in the aforesaid branching unit or combining/branching unit, set at a branch ratio other than 1:1, by a DC voltage.

(10) Instead of the first branch ratio being set at a branch ratio other than 1:1, it is also appropriate that, in a state where the first branch ratio is set at 1:1, the branch ratio is apparently set at a branch ratio other than 1:1 by producing a propagation loss in at least one of the two waveguides after the branch.

According to the above-described present invention, in a case in which the branch ratio in the aforesaid combining/branching unit stands at a branch ratio different from 1:1, output lights having different wavelength chirp quantities are obtainable from two output ports.

Therefore, an output light selecting unit is further provided to select output light from the aforesaid combining/branching unit, which enables an optical device capable of properly selecting output light with a different wavelength chirp quantity to be realized without requiring a wide DC voltage variable width.

In addition, since the fine adjustment on the aforesaid branch ratio is feasible with a DC voltage by the branch ratio adjusting unit, the needed fine adjustment on the wavelength chirp quantity can be made within a DC voltage variable width still needed.

Still additionally, in a case in which the branch ratio of the branching unit in the input section is different from 1:1, two output lights with different wavelength chirp quantities are obtainable by changing the input port.

Therefore, an input light selecting unit is further provided to select input light to the aforesaid branching unit, which enables an optical device capable of properly selecting an output light with a different wavelength chirp quantity to be realized without requiring a wide DC voltage variable width.

Moreover, since the fine adjustment on the branch ratio in the aforesaid branching unit is feasible with a DC voltage by the branch ratio adjusting unit, the needed fine adjustment on the wavelength chirp quantity can be made within a DC voltage variable width still needed.

Still moreover, when one modulator is made to have two wavelength chirp values, two types of modulators can be manufactured with one chip, which can contribute to cost reduction.

BEST MODE FOR CARRYING OUT THE INVENTION

An embodiment of the present invention will be described hereinbelow with reference to the drawings.

[A] Description of One Embodiment

Figure 1:
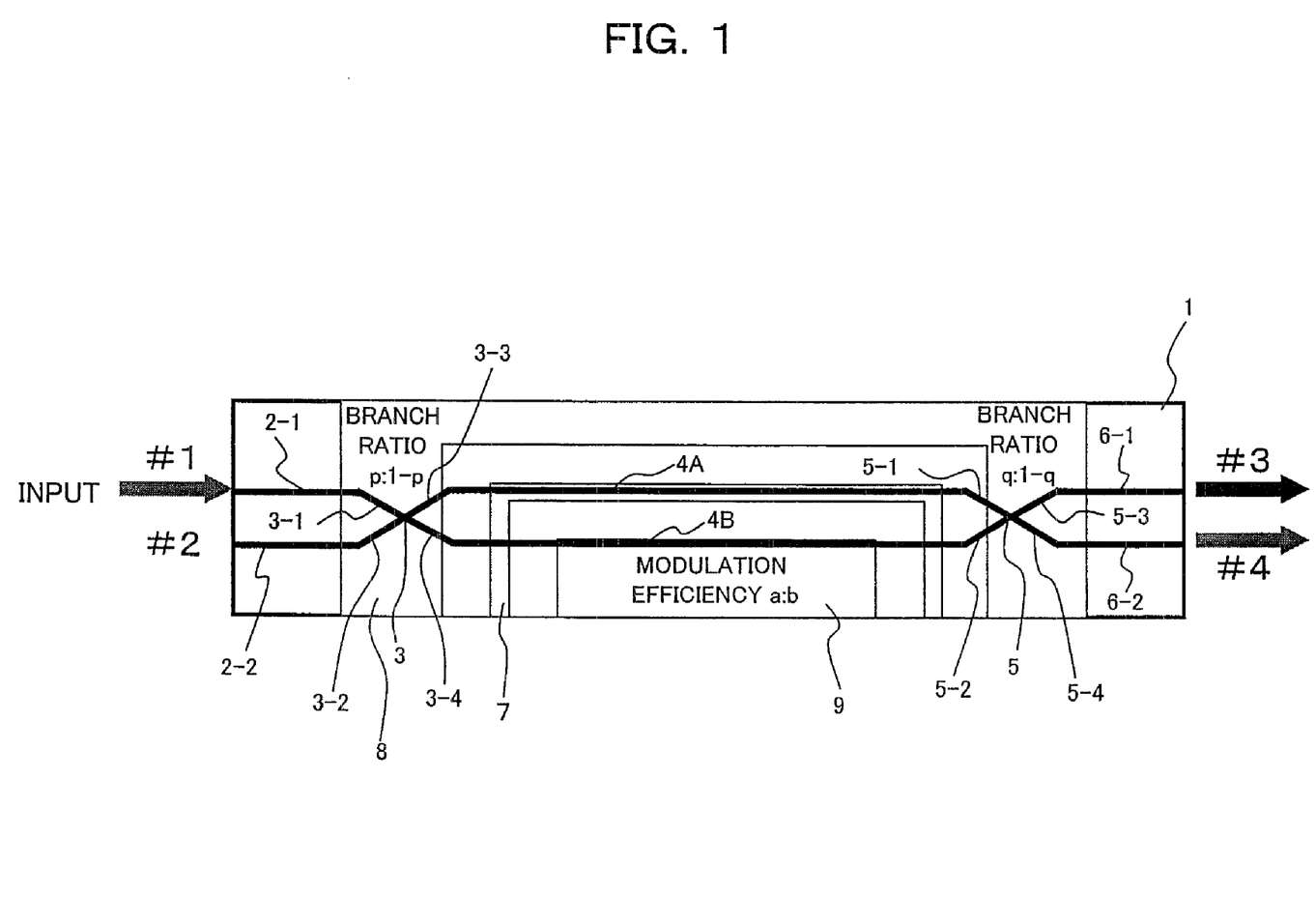
[FIG. 1] is a plan view illustratively showing a configuration of a Mach-Zehnder optical modulator as an optical device according to an embodiment of the present invention.

FIG. 1 is a plan view illustratively showing a configuration of a Mach-Zehnder optical modulator as an optical device according to an embodiment of the present invention. On a substrate (Z-cut substrate) 1 obtained by cutting a crystal such as an LN crystal or an LT crystal, which has an electro-optical effect, in a Z-axis direction of the crystal orientation, the optical modulator (Z-cut modulator) shown in FIG. 1 has two incidence waveguides 2-1 and 2-2 (input ports #1 and #2), two parallel waveguides 4A and 4B for intensity modulation, which works as an interaction region between electricity and light, an incidence side 2×2 coupler (crossing waveguide) 3, an outgoing side 2×2 coupler (crossing waveguide) 5 and two outgoing waveguides 6-1 and 6-2 (output ports #3 and #4). In addition, as well as the device shown in FIGS. 11A and 11B, a signal electrode 7 and earth electrodes 8, 9 are patterned thereon.

Also in such a Z-cut modulator, the aforesaid incidence waveguide 2-1 and 2-2, the 2×2 coupler 3, parallel waveguides 4A and 4B, the 2×2 coupler 5 and the outgoing waveguides 6-1 and 6-2 are produced by forming a metallic film on a portion of the crystal substrate 1 and making thermal diffusion thereon or by patterning a metallic film and then making proton exchange or the like in benzoic acid, thereafter placing the aforesaid electrodes 7, 8 and 9 in the vicinity of the parallel waveguides 4A and 4B.

However, since the Z-cut modulator utilizes a variation of refractive index stemming from an electric field in the Z direction as mentioned above, as mentioned above with reference to FIG. 11B, portions of the electrodes 7 and 9 are located right above the parallel waveguides 4A and 4B, respectively.

In this configuration, the aforesaid incidence side 2×2 coupler (branching unit) 3 has two input ports 3-1, 3-2 and two output ports 3-3, 3-4, and the input ports 3-1 and 3-2 are in connection (communication) with the aforesaid incidence waveguides 2-1 and 2-2, respectively, and the output ports 3-3 and 3-4 are in connection (communication) with the parallel waveguides 4A and 4B, respectively, and it is for making a power branch of incident light from one of the inputted ports 3-1 and 3-2 to the respective output ports 3-3 and 3-4 in a predetermined branch ratio (first branch ratio p:1−p) (where p is a real number satisfying 0<p<1). For example, when an incident light power (optical intensity) to one of the input ports 3-1 and 3-2 is taken as $I_0$, the incident light is power-branch-outputted so that an outgoing light power to one output port 3-4 (or 3-3) is "$(1-p)I_0$" and an outgoing light power to the other output port 3-3 (or 3-4) is "$pI_0$".

Likewise, the outgoing side 2×2 coupler (combining/branching unit) 5 has two input ports 5-1, 5-2 and two output ports 5-3, 5-4, and the input ports 5-1 and 5-2 are in connection (communication) with the aforesaid parallel waveguides 4A and 4B, respectively, and the output ports 5-3 and 5-4 are in connection (communication) with the parallel waveguides 4A and 4B, respectively, and it is for combining the incident lights from the respective input ports 5-1 and 5-2 and making a power branch thereof to the respective output ports 5-3 and 5-4 in a predetermined branch ratio (second branch ratio q:1−q) (where q is a real number satisfying 0<q<1). It is also acceptable that the relationship between p and q is p=q (≠0.5). That is, they can be equal to each other if the branch ratio in each of the incidence side 2×2 coupler 3 and the outgoing side 2×2 coupler 5 stands at a value other than 1:1.

Figure 2:
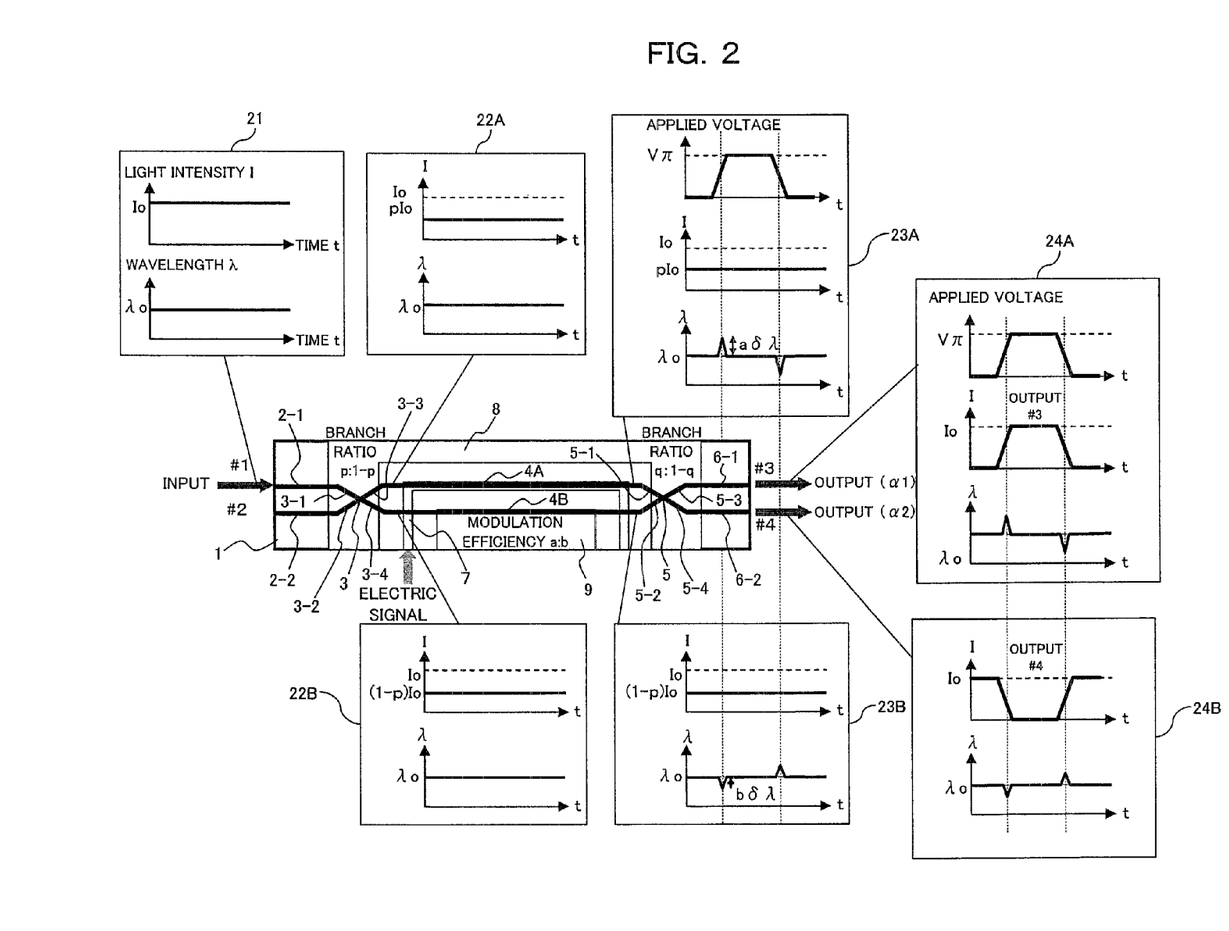
[FIG. 2] is an illustration for explaining an operation of the optical modulator shown in FIG. 1.

In the optical modulator according to this embodiment thus configured, for example, when light having a wavelength of $\lambda_0$ and a light intensity of $I_0$ is incident on one incidence waveguide 2-1 (see the frame 21 in FIG. 2), this incident light undergoes a power branch in a predetermined branch ratio (p:1−p) in the incidence side 2×2 coupler (which hereinafter will equally be referred to simply as an "incidence side coupler") 3, with the branched lights being incident through the output ports 3-3 and 3-4 on the parallel waveguides 4A and 4B. For example, the light (wavelength $\lambda_0$) having a light intensity of $pI_0$ is outputted to the output port 3-3 (parallel waveguide 4A) while the light (wavelength $\lambda_0$) having a light intensity of (1−p) $I_0$ is outputted to the output port 3-4 (parallel waveguide 4B) (see the frame 22A and the frame 22B in FIG. 2).

The respective lights subjected to the power-branch in this way propagate through the parallel waveguides 4A and 4B and enter the respective input ports 5-1 and 5-2 of the outgoing side 2×2 coupler (which hereinafter will equally be referred to simply as an "outgoing side coupler") 5. At this time, when a microwave electric signal [drive voltage (half-wavelength voltage) Vπ] is applied to the signal electrode 7, the refractive index of one parallel waveguide 4A, 4B changes to produce a phase difference between the lights propagating in both the waveguides 4A and 4B (make a phase modulation), so an intensity-modulated light (light flash) is obtainable by the combination thereof in the outgoing side 2×2 coupler 5. That is, the parallel waveguides 4A and 4B function as a phase adjusting unit to adjust the relationship in phase between the branched lights from the incidence side coupler 3 serving as the above-mentioned branching unit.

In this case, when the modulation efficiency in the parallel waveguides 4A and 4B is taken as a:b (a and b represent real numbers satisfying a+b=1), the wavelength variation quantity stemming from the above-mentioned phase modulation becomes aδλ (see the frame 23A in FIG. 2) in one parallel waveguide 4A while it becomes bδλ (see the frame 23B in FIG. 2) in the other parallel waveguide 4B. The lights subjected to this phase modulation are combined in the outgoing side 2×2 coupler 5 and, after the power branch in a predetermined branch ratio (q:1−p), the power-branched lights are outputted from the output ports 5-3 and 5-4 to the outgoing waveguides 6-1 and 6-2 (output ports #3 and #4), respectively (see the frame 24A and the frame 24B in FIG. 2).

The wavelength chirp quantity of each of the outputted lights varies due to the aforesaid branch ratio (p:1−p), (q:1−q) in the coupler 3, 5 and the aforesaid modulation efficiency (a:b) in the parallel wavelength 4A, 4B. The relationship therebetween is indicated by an α parameter indicative of the magnitude of the wavelength chirp. That is, when, in the case of input of light from the input port #1, the α parameter of the output light from the output port #3 is taken as $\alpha_{1-3}$ and the α parameter of the output light from the output port #4 is taken as $\alpha_{1-4}$ and, in the case of input of light from the input port #2, the α parameter of the output light from the output port #3 is taken as $\alpha_{2-3}$ and the α parameter of the output light from the output port #4 is taken as $\alpha_{2-4}$, $\alpha_{1-3}$ is expressed by the following equation (1), $\alpha_{1-4}$ is by the following equation (2), $\alpha_{2-3}$ is by the following equation (3) and $\alpha_{2-4}$ is by the following equation (4).

$$\alpha_{1-3} = \frac{apq - b(1-p)(1-q)}{\sqrt{pq(1-p)(1-q)}} \quad (1)$$

$$\alpha_{1-4} = \frac{ap(1-q) - bq(1-p)}{\sqrt{pq(1-p)(1-q)}} \quad (2)$$

$$\alpha_{2-3} = \frac{a(1-p)q - bp(1-q)}{\sqrt{pq(1-p)(1-q)}} \quad (3)$$

$$\alpha_{2-4} = \frac{a(1-p)(1-q) - bpq}{\sqrt{pq(1-p)(1-q)}} \quad (4)$$

CONCRETE EXAMPLES

Figure 3:
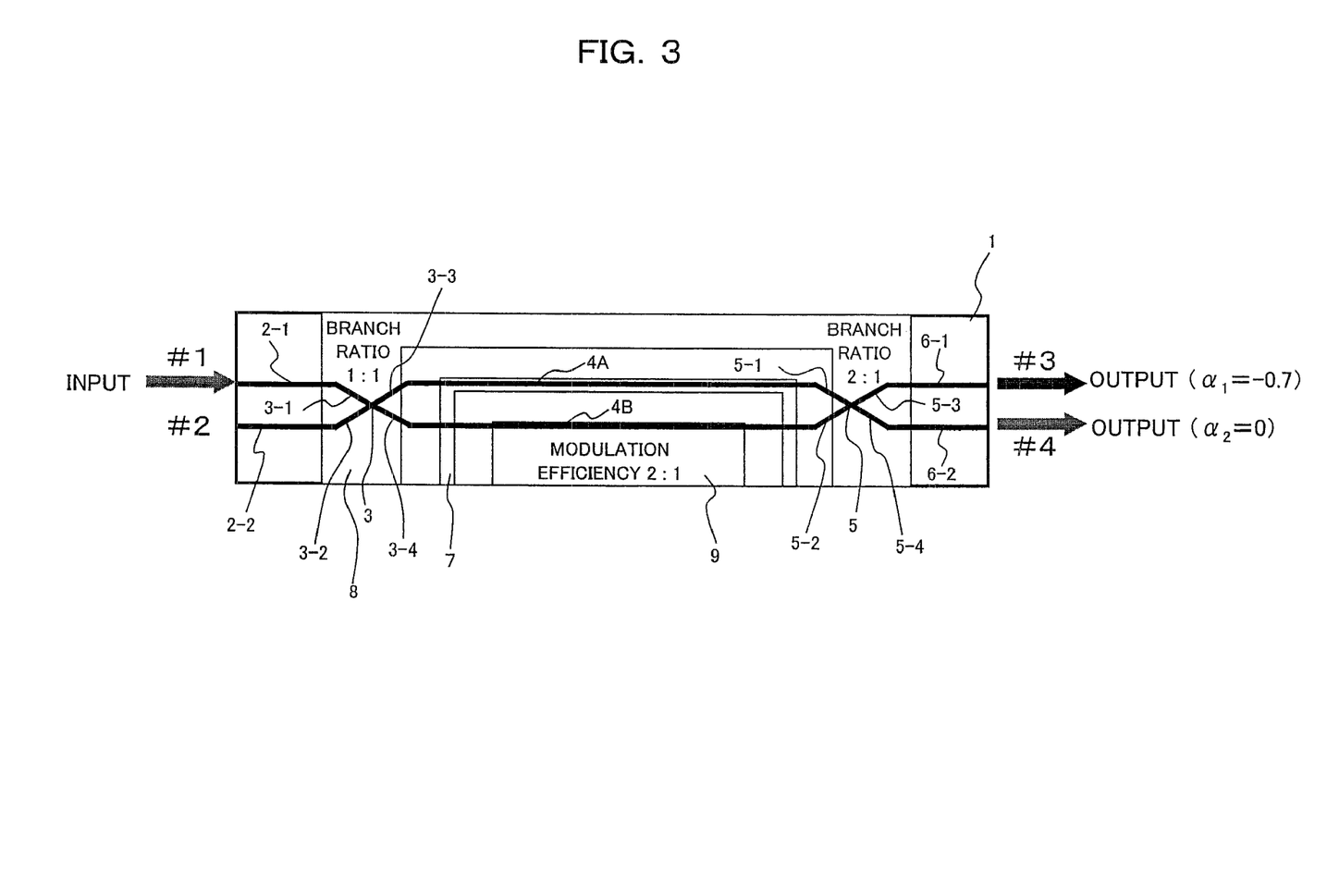
[FIG. 3] is a plan view illustratively showing a configuration of the optical modulator shown in FIG. 1 for explaining a concrete example thereof.

As a concrete example, let it be assumed that, for example, as shown in FIG. 3, the above-mentioned p=½ and q=⅔, i.e., the branch ratio in the incidence side coupler 3 is taken as 1:1 and the branch ratio in the outgoing side coupler 5 is taken as 2:1 while the above-mentioned modulation efficiency is taken as a:b=2:1.

In this case, when the light having a wavelength of $\lambda_0$ and a light intensity of $I_0$ is incident on the one incidence waveguide 2-1 (see the frame 21 in FIG. 4), this incident light is subjected to the power branch in a branch ratio 1:1 (i.e., in the same ratios) in the incidence side coupler 3, and the branched lights are incident through the output ports 3-3 and 3-4 on the parallel waveguides 4A and 4B. That is, the light (wavelength $\lambda_0$) having a light intensity (½)$I_0$ is outputted to each of the output ports 3-3 and 3-4 (parallel waveguides 4A and 4B) (see the frame 22A and the frame 22B in FIG. 4).

In this way, the lights after the power branch propagates through the parallel waveguides 4A and 4B to enter the input ports 5-1 and 5-2 of the outgoing side coupler 5, respectively. At this time, when a drive voltage (half-wavelength voltage) Vπ is applied to the signal electrode 7, a change of the refractive index of the one parallel waveguide 4A, 4B takes place to produce a phase difference between the lights propagating in both the waveguides 4A and 4B (make a phase modulation), so an intensity-modulated light (light flash) is obtainable by the combination thereof in the outgoing side 2×2 coupler 5.

Figure 4:
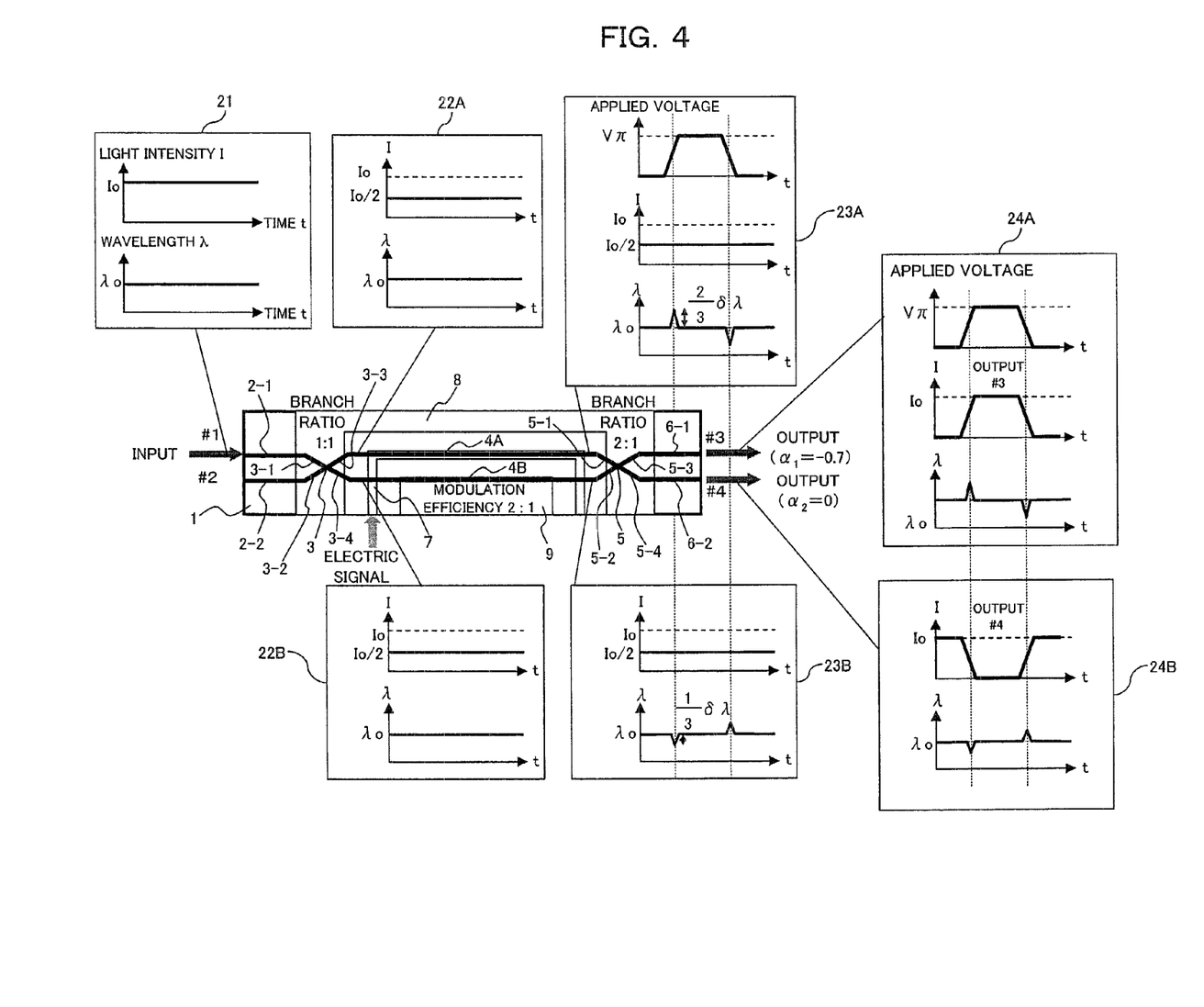
[FIG. 4] is an illustration for explaining an operation of the optical modulator shown in FIG. 3.

In this case, since the modulation efficiency is 2:1, the wavelength variation quantity stemming from the above-mentioned phase modulation becomes (⅔)δλ in one parallel waveguide 4A (see the frame 23A in FIG. 4) while it becomes (⅓)δλ in the other parallel waveguide 4B (see the frame 23B in FIG. 4). The lights subjected to this phase modulation are combined with each other in the outgoing side coupler 5 and then subjected to the power-branch in the branch ratio 2:1 and outputted from the output ports 5-3 and 5-4 to the outgoing waveguides 6-1 and 6-2 (output ports #3 and #4), respectively (see the frame 24A and the frame 24B in FIG. 4).

In this case, the wavelength chirp $\alpha_{1-3}$ of the output light from the one output port #3 becomes $\alpha_{1-3}=-0.7$ according to the aforesaid equation (1), while the wavelength chirp $\alpha_{1-4}$ of the output light from the other output port #4 becomes $\alpha_{1-4}=0$ according to the aforesaid equation (2), so the wavelength chirp quantities different from each other are obtainable from the respective output ports #3 and #4 without requiring the application of a DC voltage unlike the conventional technique.

Figure 5:
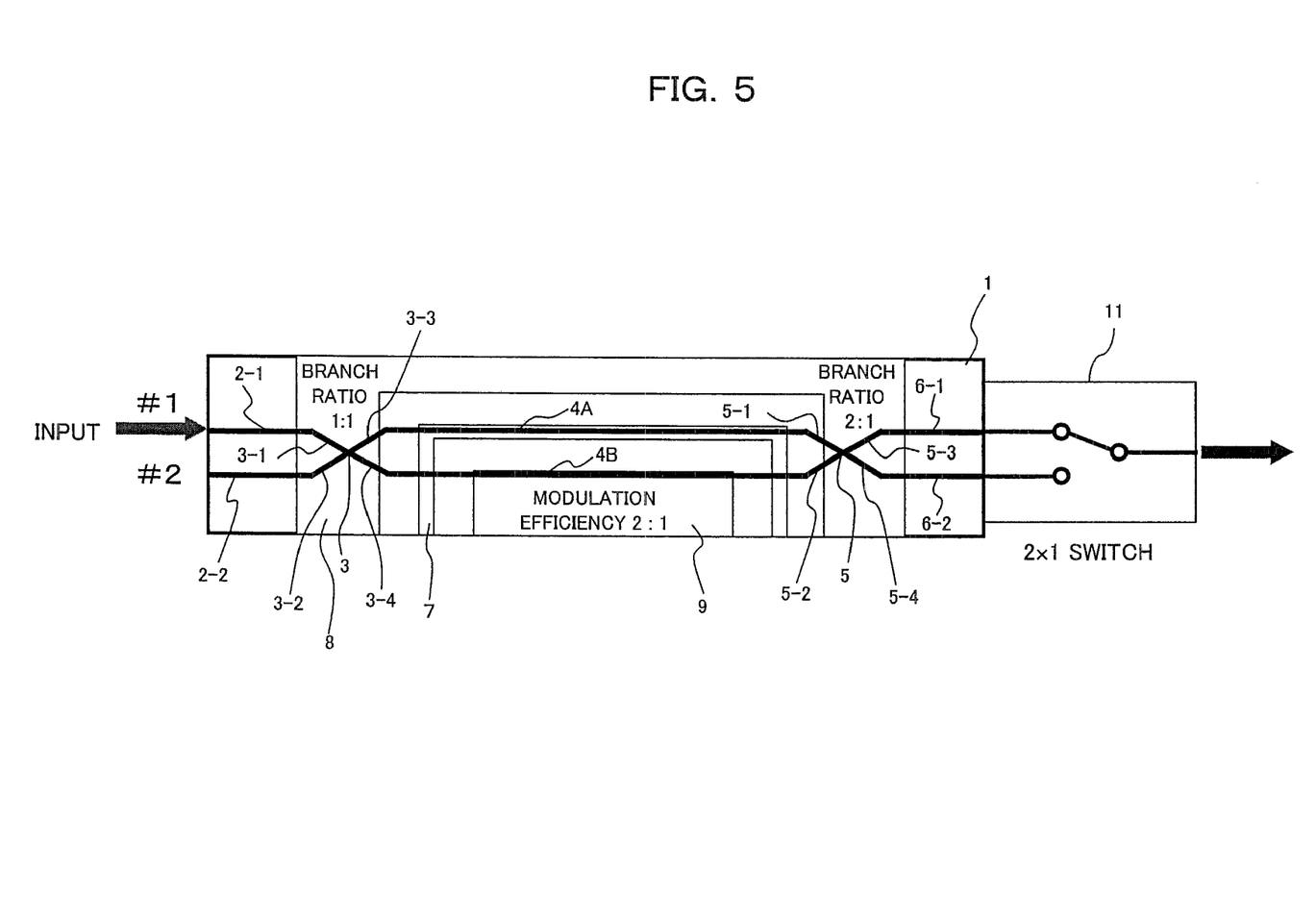
[FIG. 5] is a plan view illustratively showing a configuration in which a 2×1 switch is provided at an output of the optical modulator shown in FIG. 3.

Therefore, for example, if a 2×1 switch 11 for selectively switching the respective output lights from the output ports #3 and #4 is connected as shown in FIG. 5, an optical modulator capable of properly selecting the output light with the different wavelength chirp quantities $\alpha_{1-3}$ and $\alpha_{1-4}$ becomes realizable without requiring a wide DC voltage variable width.

[B] First Modification

Figure 6:
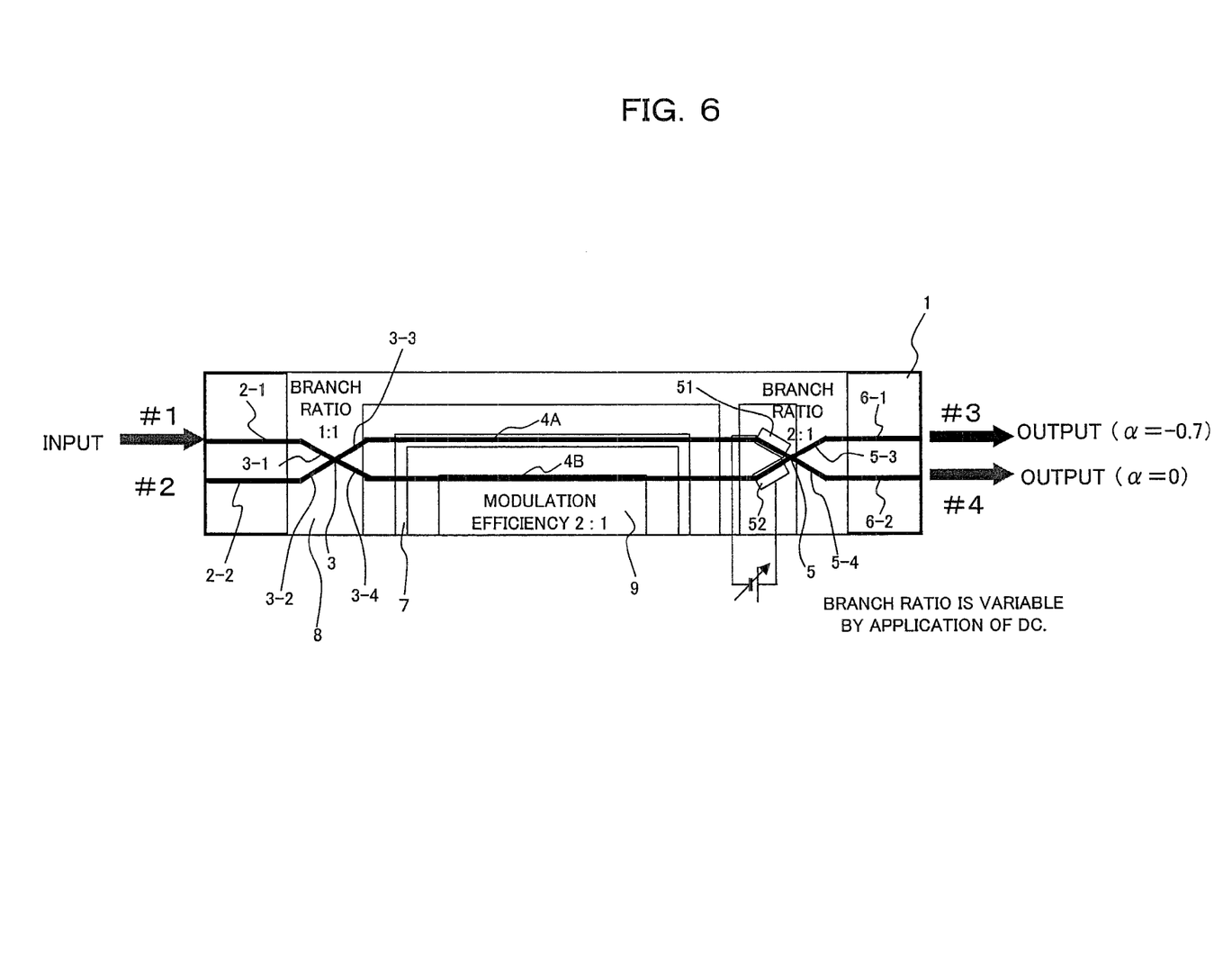
[FIG. 6] is a plan view illustratively showing a first modification of the optical modulator shown in FIG. 1.

In the above-described optical modulator, for example, as shown in FIG. 6, if electrodes 51 and 52 are respectively placed on the input ports 5-1 and 5-2 (omitted in FIG. 6) of the outgoing side coupler 5 having a set branch ratio different from 1:1 so as to apply a desired DC voltage, it is possible to change (fine-adjust) the aforesaid branch ratio in the outgoing side coupler 5 to properly change (fine-adjust) the wavelength chirp quantities $\alpha_{1-3}$ and $\alpha_{1-4}$. That is, for example, as indicated by numeral 30 in FIG. 7, in a case in which the branch ratio in the outgoing side coupler 5 stands at 2:1, the fine adjustment becomes feasible by making the shifting from the wavelength chirp quantities $\alpha_{1-3}=-0.7$ and $\alpha_{1-4}=0$ through the application of the aforesaid DC voltage.

In other words, the rough control of the wavelength chirp quantities $\alpha_{1-3}$ and $\alpha_{1-4}$ can be conducted by the design of the branch ratios in the incidence side coupler 3 and the outgoing side coupler 5 and the fine adjustment thereof can be made by the DC voltage. Unlike the conventional technique, this requires only a minimum voltage variable width needed for a necessary wavelength chirp quantity without always applying a DC voltage.

Figure 7:
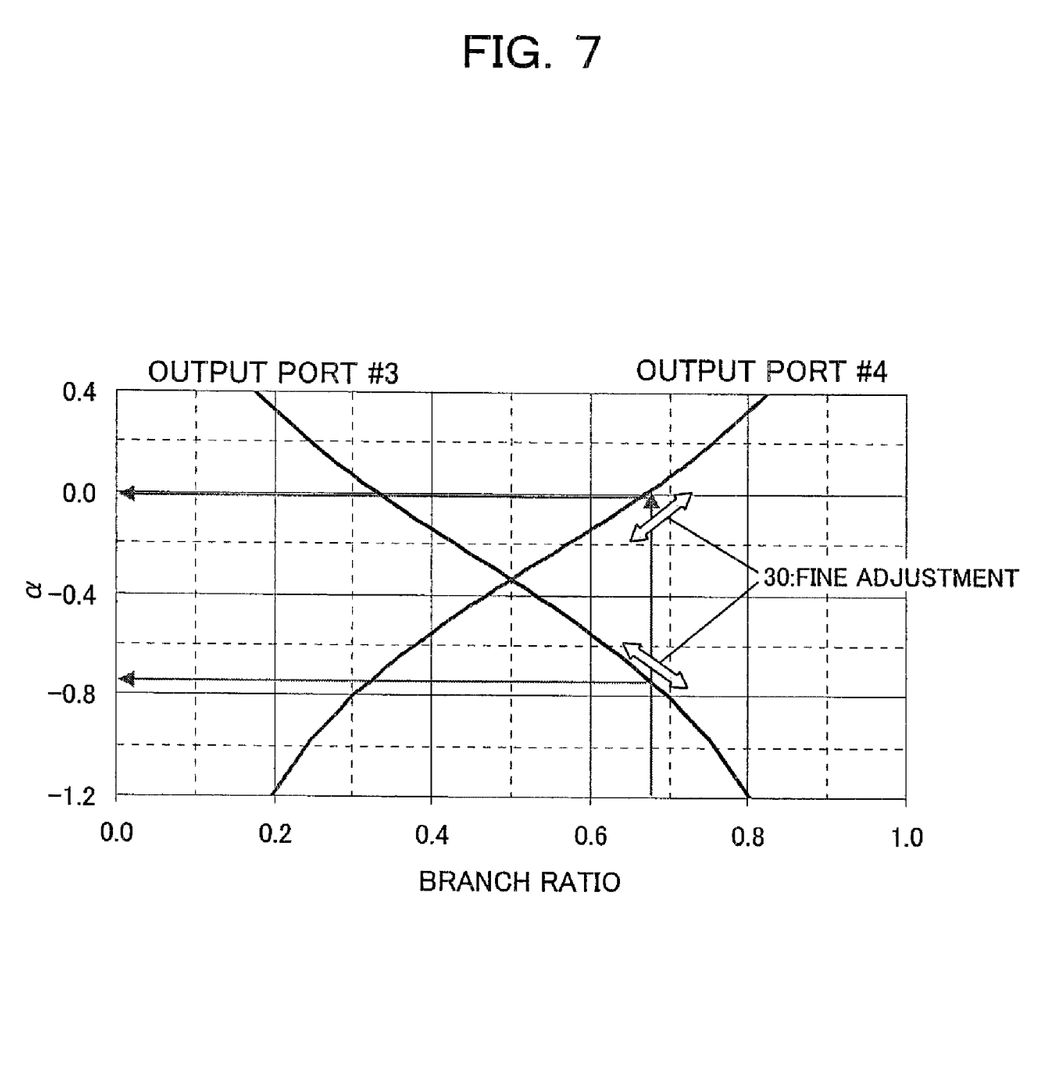
[FIG. 7] is an illustration for explaining an operation (fine adjustment on branch ratio) of the optical modulator shown in FIG. 6.

In this connection, for shifting the branch ratio to the right side in FIG. 7, the upper side electrode 51 shown in FIG. 6 can be set at a higher electric potential relative to the lower side electrode 52. Conversely, for shifting it to the left side, the upper side electrode 51 can be set at a lower electric potential relative to the lower side electrode 52.

[C] Second Modification

Figure 8:
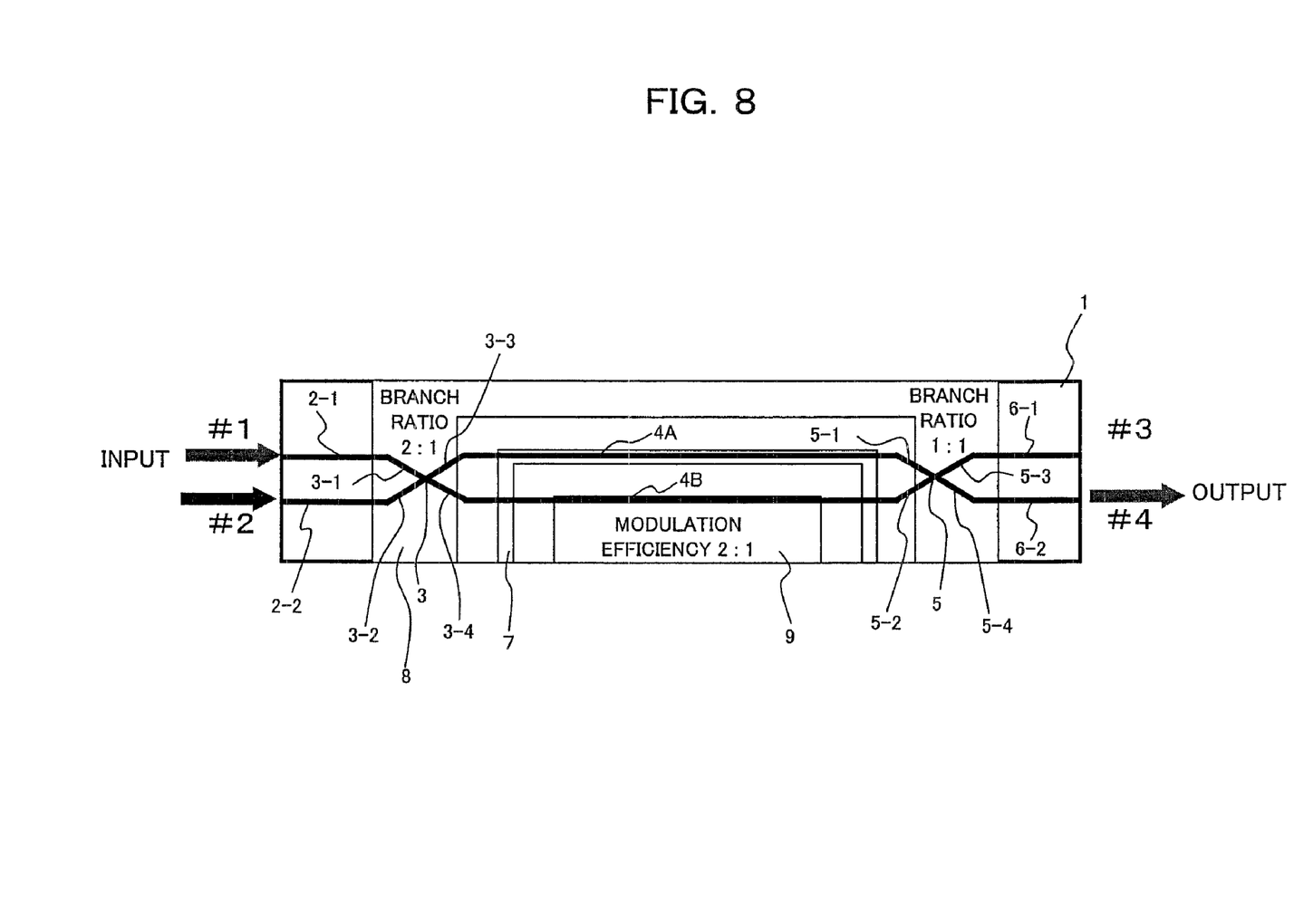
[FIG. 8] is a plan view illustratively showing a second modification of the optical modulator shown in FIG. 1.

Although in the above description the switching (selection) of the wavelength chirp quantities $\alpha_{1-3}$ and $\alpha_{1-4}$ is realized by the switching (selection) of the output waveguides 6-1 and 6-2 (output ports #3 and #4), for example, as shown in FIG. 8, the switching (selection) of the wavelength chirp quantities $\alpha_{1-4}$ and $\alpha_{2-4}$ can likewise be made even by the switching (selection) of the input waveguides 2-1 and 2-2 (input ports #1 and #2) which undergoes the incidence of light. In FIG. 8, the same reference numerals as those used above designate the same or similar parts as the above-mentioned parts unless otherwise specified particularly.

That is, in this case, for example, in a state where the branch ratio (p:1−p) of the incidence side coupler 3 is set at 2:1 (i.e., p=⅔), the branch ratio (q:1−q) of the outgoing side coupler 5 is set at 1:1 (i.e., q=½) and the modulation efficiency (a:b) is set at 2:1, when light is incident on the input port #1, the output light of the wavelength chirp quantity $\alpha_{1-4}$=0 is outputted from the output port #4 while, when light is incident on the input port #2, the output light of the wavelength chirp quantity $\alpha_{2-4}$ is outputted from the output port #4.

In more detail, when light having a wavelength of $\lambda_0$ and a light intensity of $I_0$ is incident on the input port #1 (see the frame 21 in FIG. 9), this incident light is subjected to the power branch in a branch ratio of 2:1 in the incidence side coupler 3 and the branched lights are then incident through the output ports 3-3 and 3-4 to the parallel waveguides 4A and 4B. In this case, the light (wavelength $\lambda_0$) having a light intensity of (⅔)$I_0$ is outputted to the output port 3-3 (parallel waveguide 4A) (see the frame 22A in FIG. 9) while the light (wavelength $\lambda_0$) having a light intensity of (⅓)$I_0$ is outputted to the output port 3-4 (parallel waveguide 4B) (see the frame 22B in FIG. 9).

The power-branched lights obtained in this way propagate through the parallel waveguides 4A and 4B and enter the input ports 5-1 and 5-2 of the outgoing side coupler 5, respectively. At this time, when a drive voltage (half-wavelength voltage) Vπ is put on the signal electrode 7, a change of the refractive index of one parallel waveguide 4A, 4B takes place to produce a phase difference between the lights propagating through both the waveguides 4A and 4B (make phase modulation) and they are combined with each other in the outgoing side 2×2 coupler 5, thereby providing an intensity-modulated light (light flash).

In this case, since the modulation efficiency is 2:1, the wavelength variation quantity stemming from the above-mentioned phase modulation becomes (⅔)δλ in one parallel waveguide 4A (see the frame 23A in FIG. 9) while it becomes (⅓)δλ in the other parallel waveguide 4B (see the frame 23B). The lights subjected to this phase modulation are combined with each other in the outgoing side coupler 5 and then placed into a power-divided state in the branch ratio 1:1 and outputted from the output ports 5-3 and 5-4 to the outgoing waveguides 6-1 and 6-2 (output ports #3 and #4), respectively.

Figure 9:
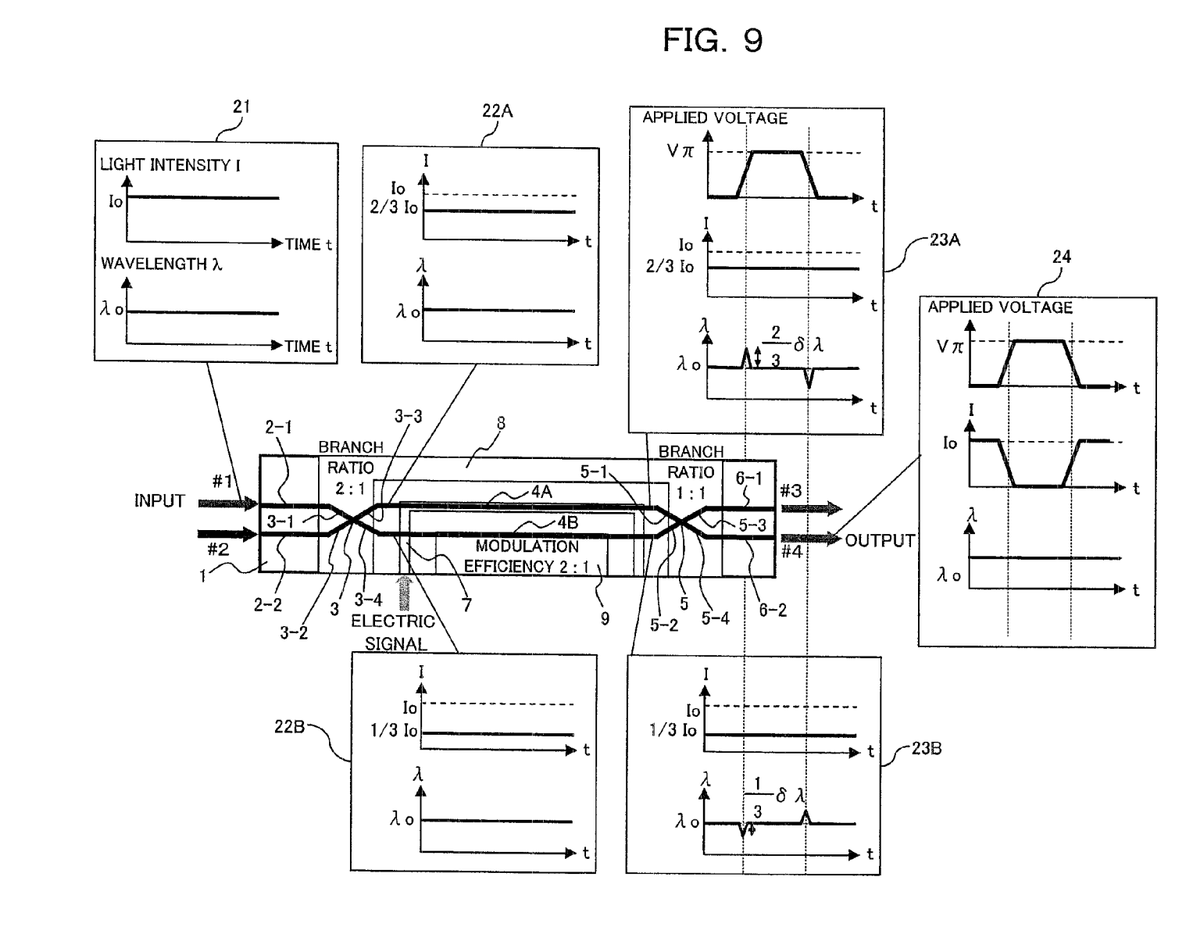
[FIG. 9] is an illustration for explaining an operation of the optical modulator shown in FIG. 8.

At this time, the wavelength chirp $\alpha_{1-4}$ of the output light from the one output port #4 becomes $\alpha_{1-4}$=0 according to the aforesaid equation (2) (see the frame 24 in FIG. 9).

On the other hand, when light having a wavelength of $\lambda_0$ and a light intensity of $I_0$ is incident from the input port #2 (see the frame 21 in FIG. 10), this incident light is subjected to the power branch in a branch ratio of 2:1 in the incidence side coupler 3 and the branched lights are then incident through the output ports 3-3 and 3-4 to the parallel waveguides 4A and 4B. In this case, the light (wavelength $\lambda_0$) having a light intensity of (⅓)$I_0$ is outputted to the output port 3-3 (parallel waveguide 4A) (see the frame 22A in FIG. 10) while the light (wavelength $\lambda_0$) having a light intensity of (⅔)$I_0$ is outputted to the output port 3-4 (parallel waveguide 4B) (see the frame 22B in FIG. 10).

The power-branched lights obtained in this way propagate through the parallel waveguides 4A and 4B and enter the input ports 5-1 and 5-2 of the outgoing side coupler 5, respectively. At this time, when a drive voltage (half-wavelength voltage) Vπ is put on the signal electrode 7, a change of the refractive index of one parallel waveguide 4A, 4B takes place to produce a phase difference between the lights propagating through both the waveguides 4A and 4B (make phase modulation) and they are combined with each other in the outgoing side 2×2 coupler 5, thereby providing an intensity-modulated light (light flash).

In this case, since the modulation efficiency is 2:1, the wavelength variation quantity stemming from the above-mentioned phase modulation becomes (⅔)δλ in one parallel waveguide 4A (see the frame 23A in FIG. 10) while it becomes (⅓)δλ in the other parallel waveguide 4B (see the frame 23B). The lights subjected to this phase modulation are combined with each other in the outgoing side coupler 5 and then placed into a power-divided condition in the branch ratio 1:1 and outputted from the output ports 5-3 and 5-4 to the outgoing waveguides 6-1 and 6-2 (output ports #3 and #4), respectively.

Figure 10:
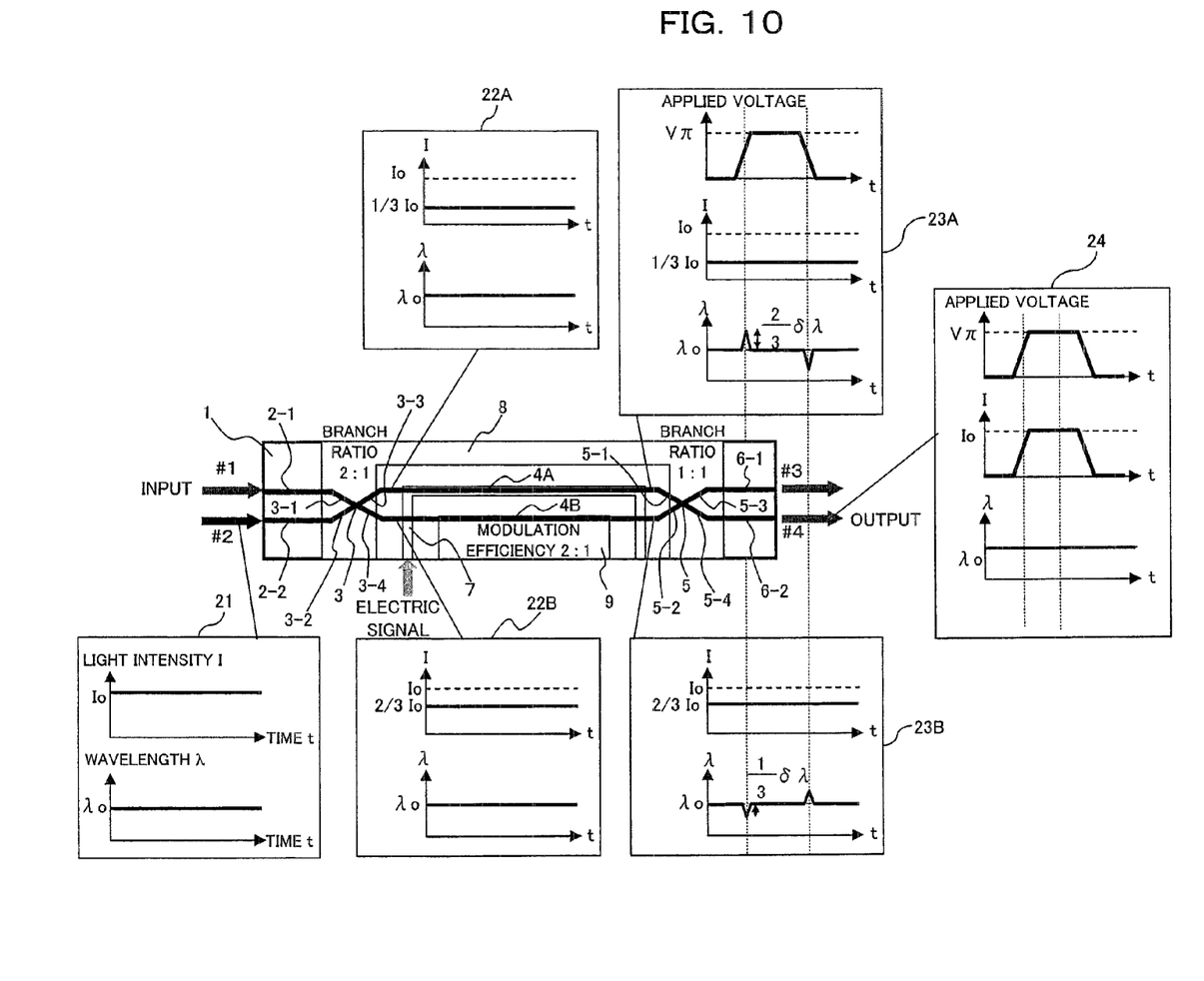
[FIG. 10] is an illustration for explaining an operation of the optical modulator shown in FIG. 8.

At this time, the wavelength chirp $\alpha_{2-4}$ of the output light from the output port #4 becomes $\alpha_{2-4}$=−0.7 according to the aforesaid equation (2) (see the frame 24 in FIG. 10).

As described above, in this modification, it is possible to realize an optical modulator capable of properly selecting the output light with the different wavelength chirp quantity $\alpha_{1-4}$ (=0), $\alpha_{2-4}$ (=−0.7) by selecting the input port #1, #2 which undergoes the incidence of light.

Although in this modification the output light port is taken as #4, even if #3 is used as the output port, it is possible to realize an optical modulator capable of properly selecting the output light with the different wavelength chirp quantity $\alpha_{2-4}$ (=0), $\alpha_{1-4}$ (=−0.7).

Also in this modification, for example, in a case in which electrodes (branch ratio adjusting unit) are respectively placed on the input ports 3-1 and 3-2 of the incidence side coupler 3 so as to apply a desired DC voltage, it is possible to change (fine-adjust) the aforesaid branch ratio in the incidence side coupler 3 for properly changing (fine-adjusting) the wavelength chirp quantities $\alpha_{1-4}$ and $\alpha_{2-4}$.

Moreover, instead of the first branch ratio being set at a branch ratio other than 1:1, it is also appropriate that, in a state where the first branch ratio is set at 1:1, the first branch ratio is apparently set at a branch ratio other than 1:1 by producing a propagation loss in at least one of the two waveguides after the branch. As a method of making a loss, for example, there is a method of thinning a portion of a buffer layer in the vicinity of a waveguide in which a loss is to be made or peeling it for the absorption in an electrode.

[D] Third Modification

As also seen with reference to FIG. 7, when the branch ratio varies, the wavelength chirp quantities of the output ports #3 and #4 vary in the opposite direction.

For example, in a case in which the branch ratio is set at 0.5 (1:1) through the coupler design, if an electric potential higher than that for the electrode 52 is applied to the electrode 51, the branch ratio increases.

Accordingly, in a case in which a desired wavelength chirp quantity lies in a wavelength chirp quantity range between −1.2 and 0.4, the desired wavelength chirp quantity is obtainable by changing the branch ratio until the wavelength chirp quantity of any one of the outputs #3 and #4 reaches the desired wavelength chirp quantity and selecting the output side having the desired wavelength chirp quantity.

If the output is one in number, when one wavelength chirp quantity in a range between −1.2 and 0.4 is outputted, there is a need to change the branch ratio between 0.2 and 0.8, that is, there is a need to double the change of the branch ratio. Therefore, the employment of this embodiment is useful.

Naturally, when the branch ratio is controlled in a direction (0.2) decreasing from 0.5, likewise, the wavelength chirp quantity can be changed in the range from −1.2 to 0.4.

From the above, in general, from viewpoint of narrowing the voltage control range with respect to a variation of the wavelength chirp quantity, it is preferable to control the branch ratio in a range larger (or smaller) than 0.5 without controlling the branch ratio to cross 0.5.

The present invention is not limited to the above-described embodiments, and it is intended to cover all changes and modifications of the embodiments herein which do not constitute departures from the spirit and scope of the invention.

For example, although in the above description the embodiments relate to a single optical modulator serving as an optical device, it is also expectable that different optical devices partially having the above-described configuration provide the advantages and effects similar to those mentioned above.

INDUSTRIAL APPLICABILITY

As described above in detail, with an optical device according to the present invention at least one of the branch ratios of the branching unit and the combining/branching unit is previously set (designed) at a branch ratio different from 1:1, which can realize an optical device capable of properly selecting an output light with a different wavelength chirp quantity. Therefore, even in a case in which an optical transmission distance is changed after the construction of a system, there is no need to replace the optical device with one having a desired wavelength chirp quantity, so a system with high flexibility is realizable and, hence, it is considered that the present invention is extremely useful in the fields of optical communication techniques.

What is claimed is:

1. An optical device comprising:
a branching unit which branches incident light in a first branch ratio;
a phase adjusting unit for adjusting the relationship in phase among branched lights obtained by said branching unit; and
a combining/branching unit which combines the lights after the phase adjustment by said phase adjusting unit and branches the combined light in a second branch ratio to thereby output first and second output lights at a same wavelength as the incident light,
wherein at least one of said first branch ratio and said second branch ratio is set at a branch ratio other than 1:1, so that the first and second output lights have different wavelength chirps from each other.

2. The optical device according to claim 1, characterized in that, when said first branch ratio is p:1−p (0<p<1), said second branch ratio is q:1−q (0<q<1) and an optical modulation efficiency stemming from the adjustment of the phase relationship in said phase adjusting unit is a:b (where a+b=1), light is inputted from one inputting port of said branching unit and one output light from said combining/branching unit has a wavelength chirp quantity $\alpha_{1\text{-}3}$ expressed by the following equation (1) and the other output light has a wavelength chirp quantity $\alpha_{1\text{-}4}$ expressed by the following equation (2), while light is inputted from the other inputting port of said branching unit and one output light from said combining/branching unit has a wavelength chirp quantity $\alpha_{2\text{-}3}$ expressed by the following equation (3) and the other output light has a wavelength chirp quantity $\alpha_{2\text{-}4}$ expressed by the following equation (4)

$$\alpha_{1-3} = \frac{apq - b(1-p)(1-q)}{\sqrt{pq(1-p)(1-q)}} \quad (1)$$

$$\alpha_{1-4} = \frac{ap(1-q) - bq(1-p)}{\sqrt{pq(1-p)(1-q)}} \quad (2)$$

$$\alpha_{2-3} = \frac{a(1-p)q - bq(1-q)}{\sqrt{pq(1-p)(1-q)}} \quad (3)$$

$$\alpha_{2-4} = \frac{a(1-p)(1-q) - bpq}{\sqrt{pq(1-p)(1-q)}}. \quad (4)$$

3. The optical device according to claim 2, wherein said first branch ratio is set at 1:1 while said second branch ratio is set at 2:1, and said modulation efficiency is set at 2:1.

4. The optical device according to claim 2, wherein said first branch ratio is set at 2:1 while said second branch ratio is set at 1:1, and said modulation efficiency is set at 2:1.

5. The optical device according to claim 1, further comprising an output light selecting unit which selects output light of said combining/branching unit when said second branch ratio is set at a branch ratio other than 1:1.

6. The optical device according to claim 1, further comprising an input light selecting unit which selects input light to said branching unit when said first branch ratio is set at a branch ratio other than 1:1.

7. The optical device according to claim 1, wherein said first branch ratio is set at 1:1 while said second branch ratio is set at 2:1.

8. The optical device according to claim 1, wherein said first branch ratio is set at 2:1 while said second branch ratio is set at 1:1.

9. The optical device according to claim 1, further comprising a branch ratio adjusting unit which fine-adjusts the branch ratio in said branching unit or said combining/branching unit, set at a branch ratio other than 1:1, by a DC voltage.

10. The optical device according to claim 1, wherein said first branch ratio is set at a branch ratio other than 1:1 by producing a loss in at least one of two waveguides after the branch in said branching unit.

11. A Mach-Zehnder optical modulator receiving an input light, and comprising:
a branching unit branching the received input light with a first branch ratio into first and second branched lights;

a phase adjusting unit adjusting a relationship in phase between the first and second branched lights, to thereby provide phase adjusted first and second branched lights; and a combining/branching unit combining the phase adjusted first and second branched lights, and branching the combined phase adjusted first and second branched lights with a second branch ratio into first and second output lights which are output from the Mach-Zehnder optical modulator and which are at a same wavelength as the input light, wherein at least one of said first branch ratio and said second branch ratio is set at a branch ratio other than 1:1, and the first and second output lights thereby have different wavelength chirps from each other.

* * * * *